United States Patent [19]

Kawachi et al.

[11] 4,344,099
[45] Aug. 10, 1982

[54] HEAD VERTICAL ALIGNMENT MEANS FOR A TAPE RECORDER

[75] Inventors: Hideo Kawachi, Ichikawa; Niro Nakamichi, Higashikurume, both of Japan

[73] Assignee: Nakamichi Corporation, Tokyo, Japan

[21] Appl. No.: 160,212

[22] Filed: Jun. 17, 1980

[30] Foreign Application Priority Data

Jun. 18, 1979 [JP] Japan .................. 54-83130[U]

[51] Int. Cl.³ .................. G11B 21/24; G11B 5/56
[52] U.S. Cl. .................. 360/109
[58] Field of Search .......... 360/109, 105, 128; 74/52–53, 55, 99 A

[56] References Cited

U.S. PATENT DOCUMENTS

| | | | |
|---|---|---|---|
| 3,794,769 | 2/1974 | Neff | 360/109 |
| 3,900,888 | 8/1975 | Uchikoshi et al. | 360/109 |
| 3,943,569 | 3/1976 | Bettini | 360/105 |
| 4,052,745 | 10/1977 | Nackamichi | 360/109 |
| 4,086,638 | 4/1978 | Saito | 360/109 |
| 4,158,212 | 6/1979 | Dattilo | 360/109 |
| 4,268,881 | 5/1981 | Saito | 360/109 |

Primary Examiner—Alfred H. Eddleman

Attorney, Agent, or Firm—Pearne, Gordon, Sessions, McCoy & Granger

[57] ABSTRACT

This invention relates to azimuth adjustment means for a magnetic head and, more particularly, to azimuth adjustment means for a magnetic head adapted to precisely adjust the azimuth of the magnetic head by remote control. The head azimuth adjustment means comprises an azimuth adjustment screw having its end acting on a head base on which a magnetic head is mounted and rotatable so that the head base is positioned so as to have the proper azimuthal position of the magnetic head. The head azimuth adjustment means further comprises an adjustment member interposed between the end of the azimuth adjustment screw and the head base and slidably movable in its longitudinal direction, the adjustment member having an inclined surface provided thereon in a direction of its slidable movement. If the slidable adjustment member is slidably moved in one direction, then the magnetic head is adjusted in its azimuthal position in one direction, and if the adjustment member is slidably moved in another direction, then the magnetic head is adjusted in its azimuthal position in another direction. Thus, the magnetic head is accurately aligned in its azimuthal position by properly moving the slidable adjustment member.

4 Claims, 3 Drawing Figures

HEAD VERTICAL ALIGNMENT MEANS FOR A TAPE RECORDER

BACKGROUND OF THE INVENTION

In order to record a signal on a magnetic tape by a magnetic head and/or to reproduce the signal from the magnetic tape by the magnetic head in a tape recorder, it is required that the magnetic head uniformly contacts the magnetic tape while a gap of the magnetic head is properly positioned relative to a given track of the magnetic tape. To this end, the tape recorder is usually provided with azimuth adjustment means to adjust the azimuth of the magnetic head. In one prior azimuth adjustment means, for example, a rotary motion of a rotatable member having an inclined surface provided thereon has been used for adjusting the azimuth. However, it is difficult for such prior means to precisely adjust the azimuth of the magnetic head because the adjustment is made only by the rotary motion of the rotatable member. Also, it is difficult to adjust the azimuth by remote control.

SUMMARY OF THE INVENTION

Accordingly, it is a principal object of the invention to provide azimuth adjustment means for a magnetic head for a tape recorder wherein a magnetic head can be easily adjusted in azimuth at a position far away from the magnetic head.

It is another object of the invention to provide azimuth adjustment means for a magnetic head wherein the magnetic head can be automatically adjusted in azimuth by association with an automatic control.

In accordance with the invention, there is provided azimuth adjustment means for a magnetic head in which a head base having a magnetic head securely mounted thereon is pivotally moved relative to a chassis by a rotary motion of an azimuth adjustment screw so as to adjust the azimuth of said magnetic head, comprising a slidable member having an inclined surface engaging said azimuth adjustment screw to be slidably interposed between said head base and said azimuth adjustment screw whereby both the rotary motion of said azimuth adjustment screw and the sliding motion of said slidable member cause said head base to move pivotally.

BRIEF DESCRIPTION OF THE DRAWING

The above and other objects and features of the invention will be apparent from the description of the embodiment taken with reference to the accompanying drawing in which.

DETAILED DESCRIPTION OF THE EMBODIMENT

Figure 1:
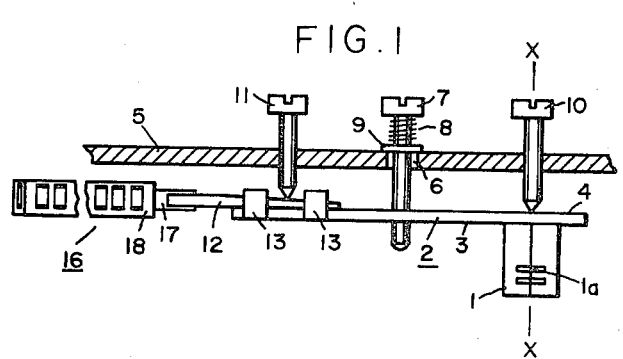
FIG. 1 is an elevational view of head azimuth adjustment means of the invention with a portion taken in section.
Figure 2:
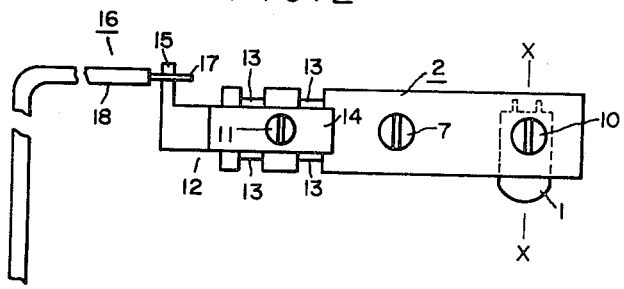
FIG. 2 is a plan view of the head azimuth adjustment means of FIG. 1.

Referring now to FIGS. 1 and 2, there is shown a chassis 5 under which is disposed a head base 2 having a magnetic head 1 securely mounted on the head base 2 at its one end. A bolt 7 extends through a hole 6 in the chassis 5 and threadedly extends into the head base 2 at its center portion. A coil spring 8 is provided around the bolt 7 between a head portion of the bolt 7 and the chassis 5 so that the head base 2 is urged toward the chassis 5. A washer 9 may be provided between the lower edge of the coil spring 8 and the chassis 5.

A level adjustment screw 10 threadedly extends through the chassis 5 and at its end abuts a surface 4 of the head base 2 opposite to the surface 3 having the magnetic head 1 on a gap defining plane X—X of the magnetic head 1.

An azimuth adjustment screw 11 which is disposed in a manner symmetrical to the level adjustment screw 10 relative to the axis of the bolt 7, threadedly extends through the chassis 5 and at its end acts on the other end of the head base 2 so that the head base 2 is pivotally moved about the end of the level adjustment screw 10 against the urging of the coil spring 8.

A slidable member 12 may be formed of material of low friction coefficient such as synthetic resin, for example, and is interposed between the end of the azimuth adjustment screw 11 and the head base 2. The slidable member 12 is slidably movable in a longitudinal direction along a pair of guides 13 which may be formed of bent portions extending integrally with the sides of the head base 2.

Figure 3:
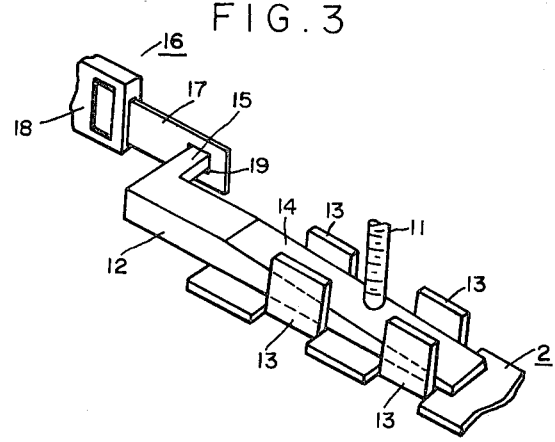
FIG. 3 is a perspective view of an adjustment member used in the head azimuth adjustment means of FIGS. 1 and 2.

The slidable member 12 has an inclined surface 14 provided on its upper side so as to have its thickness increased in a direction of its slidable movement from the rightward end to the leftward end of the slidable member 12 as shown in FIGS. 1 and 3. A lug 15 may be provided integrally with the slidable member 12 at its leftward end.

An operating member 16 may comprise a flexible elongated body 17 of resilient strip and a holder 18 of synthetic resin in which the flexible elongated body 17 is slidably contained. The lug 15 of the slidable member 12 may extend through an opening 19 in the flexible elongated body 17 at one end so that the slidable member 12 is mechanically connected to the flexible elongated body 17. A not shown operating knob may be connected to the other end of the flexible elongated body 17. Since the elongated body 17 is flexible as aforementioned, it may extend far from the slidable member 12 and the operating knob may be positioned at any suitable location.

In the head azimuth adjustment means of the invention, the level or verticle position of the magnetic head 1 can be adjusted to a magnetic tape traveling in a tape recorder by angularly moving the level adjustment screw 10. The azimuth adjustment of the gap 1a of the magnetic head 1 can be, as conventional, accomplished by angularly moving the azimuth adjustment screw 11 to pivotally move the head base 2 about the end of the level adjustment screw 10. It will be noted that the rotary motion of the azimuth adjustment screw 11 never affects the level or vertical position of the magnetic head 1 because the end of the level adjustment screw 10 is positioned on the gap defining plane X—X of the magnetic head 1.

The azimuth adjustment of the gap 1a of the magnetic head 1 can be also accomplished by the sliding motion of the slidable member 12 in addition to the rotary motion of the azimuth adjustment screw 11. Thus, it will be noted that the azimuth of the magnetic head 1 can be adjusted by remote control.

Instead of the knob connected to the flexible elongated body 17, a control motor may be connected to the flexible elongated body 17. The control motor may be operated by electrically detecting the azimuth condition of the gap 1a of the magnetic head 1. It should be noted that the tape recorder is designed in a favorable manner because the control motor can be positioned at any suitable location, and that this prevents an unfavorable noise from being introduced into the magnetic head from the control motor.

The inclination angle of the inclined surface 14 of the adjustment member 12 may be much less than that of the thread of the azimuth adjustment screw 11. It will be noted that this causes the gap 1a of the magnetic head 1 to be roughly aligned by the azimuth adjustment screw 11 and finely aligned by the slidable member 12.

While one preferred embodiment of the invention has been illustrated and described with reference to the accompanying drawing, it will be understood that it is by way of example, and that various changes and modifications may be made without departing from the spirit and scope of the invention, which is intended to be defined only by the appended claims.

What is claimed is:

1. Azimuth adjustment means for a magnetic head in which a head base having a magnetic head securely mounted thereon is pivotally moved relative to a chassis by a rotary motion of an azimuth adjustment screw so as to adjust the azimuth of said magnetic head, comprising a slidable member having an inclined surface engaging said azimuth adjustment screw to be slidably interposed between said head base and said azimuth adjustment screw whereby both the rotary motion of said azimuth adjustment screw and the sliding motion of said slidable member cause said head base to move pivotally.

2. Azimuth adjustment means for a magnetic head as set forth in claim 1, including an operating member connected to said slidable member so as to drive the latter.

3. Azimuth adjustment means for a magnetic head as set forth in claim 2, and wherein said operating member includes a flexible elongated body which extends a considerable distance from said slidable member.

4. Azimuth adjustment means for a magnetic head as set forth in claim 3, wherein said operating member further includes a holder in which said flexible elongated body is slidably contained.

* * * * *